United States Patent
Maldonado

(10) Patent No.: US 8,397,516 B2
(45) Date of Patent: Mar. 19, 2013

(54) APPARATUS AND METHOD FOR REMOVING HEAT FROM A GAS TURBINE

(75) Inventor: Jaime Javier Maldonado, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 12/571,646

(22) Filed: Oct. 1, 2009

(65) Prior Publication Data

US 2011/0079021 A1   Apr. 7, 2011

(51) Int. Cl.
*F02C 7/12* (2006.01)
(52) U.S. Cl. .......................... 60/806; 415/115
(58) Field of Classification Search ............ 60/39.182, 60/782, 785, 806, 752–760; 415/115, 177–178; 416/96 A, 97 A, 96 R, 97 R
See application file for complete search history.

(56) References Cited

U.S. PATENT DOCUMENTS

| | | | | |
|---|---|---|---|---|
| 2,647,368 A * | 8/1953 | Triebbnigg et al. | ............. | 60/775 |
| 3,355,883 A * | 12/1967 | Beam, Jr. | .................. | 60/39.511 |
| 4,218,179 A * | 8/1980 | Barry et al. | .................. | 415/114 |
| 4,419,044 A * | 12/1983 | Barry et al. | .................... | 415/117 |
| 5,120,192 A * | 6/1992 | Ohtomo et al. | ............... | 415/115 |
| 5,125,793 A * | 6/1992 | MacArthur et al. | .......... | 415/114 |
| 5,253,976 A * | 10/1993 | Cunha | ........................... | 415/114 |
| 5,630,700 A * | 5/1997 | Olsen et al. | .................... | 415/134 |
| 6,295,803 B1 * | 10/2001 | Bancalari | .................. | 60/39.511 |
| 6,543,993 B2 | 4/2003 | Burdgick et al. | | |
| 6,622,470 B2 | 9/2003 | Viteri et al. | | |
| 6,872,047 B2 * | 3/2005 | Tanioka | ....................... | 415/114 |
| 7,201,564 B2 * | 4/2007 | Bolms et al. | ................ | 416/97 R |
| 7,434,402 B2 * | 10/2008 | Paprotna et al. | ................ | 60/772 |
| 7,503,749 B2 | 3/2009 | Lee et al. | | |
| 7,658,076 B2 * | 2/2010 | Hoffmann | ........................ | 60/754 |
| 7,909,507 B2 * | 3/2011 | Bunker et al. | ................ | 374/121 |
| 2008/0053100 A1 | 3/2008 | Venkataramani et al. | | |

* cited by examiner

*Primary Examiner* — Phutthiwat Wongwian
(74) *Attorney, Agent, or Firm* — Dority & Manning, P.A.

(57) ABSTRACT

An apparatus for removing heat from a turbine includes a stator having a cavity and a first plenum and a second plenum inside the cavity. The second plenum is connected to the first plenum and surrounds the first plenum inside the cavity. A refrigerant flows through the first plenum and the second plenum to remove heat from the stator. A method for cooling a turbine includes forming a cavity in a component to be cooled, installing a first plenum inside the cavity, and installing a second plenum inside the cavity. The method further includes connecting the second plenum to the first plenum, surrounding the first plenum with the second plenum inside the cavity, and flowing a refrigerant through the first plenum and the second plenum to cool the component.

18 Claims, 4 Drawing Sheets

APPARATUS AND METHOD FOR REMOVING HEAT FROM A GAS TURBINE

FIELD OF THE INVENTION

The present invention generally involves an apparatus and method for removing heat from gas turbine components. Specifically, the present invention includes a cooling system that provides radiation cooling for combustors, stators, casings, and other gas turbine components.

BACKGROUND OF THE INVENTION

Gas turbines are widely used in commercial operations for power generation. A typical gas turbine includes a compressor at the front, one or more combustors around the middle, and a turbine at the rear. The compressor imparts kinetic energy to the working fluid (air) to bring it to a highly energized state. The compressed working fluid exits the compressor and flows to the combustors. The combustors mix fuel with the compressed working fluid, and the mixture of fuel and working fluid ignites to generate combustion gases having a high temperature, pressure, and velocity. The combustion gases flow to the turbine where they expand to produce work.

It is widely known that the thermodynamic efficiency of a gas turbine increases as the operating temperature, namely the combustion gas temperature, increases. Higher temperature combustion gases contain more energy and produce more work as the combustion gases expand in the turbine. However, higher temperature combustion gases may produce excessive temperatures in the turbine that can approach or exceed the melting temperature of various turbine components.

A variety of techniques exist to allow the combustors to operate at higher temperatures. For example, air may be extracted from the compressor, bypassed around the combustors, and injected directly into the stream of combustion gases in the turbine to provide conductive and/or convective cooling to the turbine stages. However, the air extracted from the compressor has already been compressed, and thus heated, by some amount, thereby reducing the heat removal capability of the extracted air. In addition, since the extracted air bypasses the combustors, extracting air from the compressor reduces the volume of combustion gases and overall efficiency and output of the gas turbine.

Another method to cool turbine components is to circulate air through the interior of the turbine components. For example, the turbine typically includes stationary nozzles or stators and rotating blades or buckets. The stators and/or buckets may include internal passages through which cooling air may flow. As the cooling air flows through the internal passages, the cooling air directly contacts the walls of the internal passages to remove heat from the stators and/or buckets through conductive or convective cooling. A disadvantage of this cooling method is the increased manufacturing costs associated with fabricating the detailed and contoured internal passages in the stators and/or buckets. In addition, the cooling air flowing through the internal passages preferably must be at a pressure greater than the combustion gases flowing outside of the turbine component to minimize the risk that the combustion gases may penetrate the stators and/or buckets, thereby eliminating any cooling provided by the cooling air. Lastly, removal of heat from the gas turbine, without producing work from that heat, necessarily reduces the overall thermodynamic efficiency of the gas turbine.

Therefore, the need exists for a cooling system that can remove heat from gas turbine components that avoids some or all of the disadvantages of existing systems. Ideally, the cooling system will provide cooling to the gas turbine components without increasing manufacturing costs or decreasing the overall operating efficiency of the gas turbine.

BRIEF DESCRIPTION OF THE INVENTION

Aspects and advantages of the invention are set forth below in the following description, or may be obvious from the description, or may be learned through practice of the invention.

One embodiment of the present invention is an apparatus for removing heat from a gas turbine having one or more combustors and a turbine. The apparatus includes a component in the gas turbine, and the component includes a cavity therein. The apparatus further includes a first plenum and a second plenum inside the cavity. The second plenum is connected to the first plenum and surrounds the first plenum inside the cavity. A refrigerant flows through the first plenum and the second plenum to remove heat from the gas turbine component.

Another embodiment of the present invention is an apparatus for removing heat from a turbine. The apparatus includes a stator having an internal cavity. A first plenum is inside the cavity, and a second plenum is inside the cavity and connected to the first plenum. The second plenum surrounds the first plenum inside the cavity. A refrigerant flows through the first plenum and the second plenum to remove heat from the stator.

The present invention also includes a method for cooling a turbine. The method includes forming a cavity in a component to be cooled, installing a first plenum inside the cavity, and installing a second plenum inside the cavity. The method further includes connecting the second plenum to the first plenum, surrounding the first plenum with the second plenum inside the cavity, and flowing a refrigerant through the first plenum and the second plenum to cool the component.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
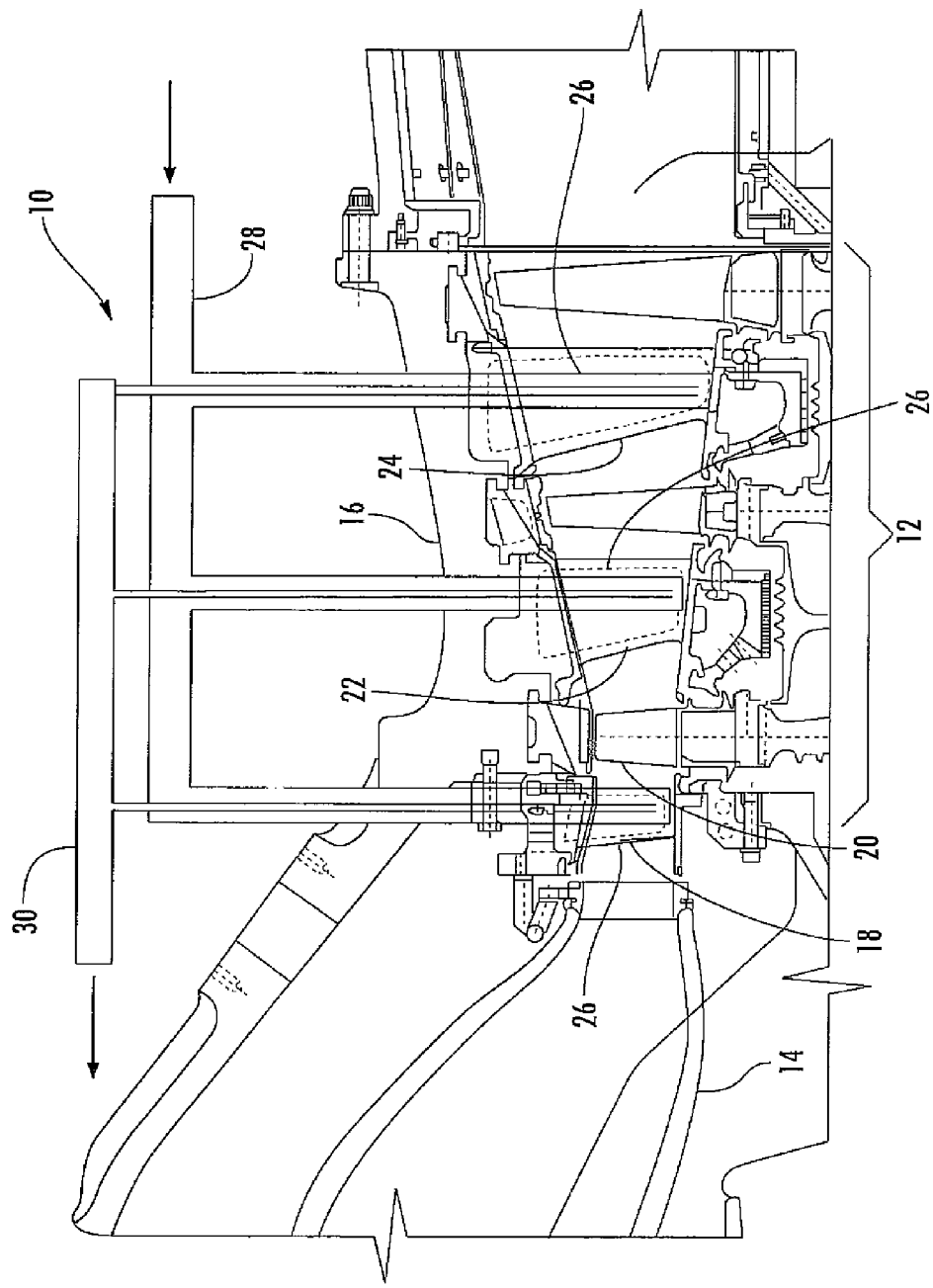
FIG. 1 is a simplified cross-section of a cooling system according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 shows a simplified cross-section of a cooling system 10 according to one embodiment of the present invention. In this particular embodiment, the cooling system 10 is being used to remove heat from stators in a turbine 12. Although the cooling system 10 is described and illustrated in the context of turbine stators, the scope of the present invention is not limited to cooling turbine stators, and one of ordinary skill in the art would understand that the cooling system 10 may be adapted to remove heat from virtually any gas turbine component.

Referring to FIG. 1, combustion gases flow from left to right, from the combustors (not shown), through a transition piece 14, to the turbine 12. A casing 16 contains the combustion gases within the turbine 12 and directs the combustion gases to a first stage stator 18. The first stage stator 18 channels the combustion gases onto a first stage bucket 20 where expansion of the combustion gases causes the bucket 20 to rotate to produce work. The combustion gases then flow to a second stage stator 22, where the process repeats until the combustion gases have passed through each stage of the turbine 12. As the combustion gases pass through the turbine stages, heat from the combustion gases increases the temperature of the various turbine components along the hot gas path. For example, the combustion gases heat up the casing 16 and the stators 18, 22, 24 in the turbine 12.

In the embodiment shown in FIG. 1, each stator 18, 22, 24 defines a cavity (represented by dashed boxes 26) on the inside of the stator. A supply plenum 28 containing a refrigerant passes through the casing 16 to provide a fluid communication for the refrigerant to flow or reach into each cavity 26. An exhaust plenum 30 connects to the supply plenum 28 inside each cavity 26 and exits the casing 16 to provide a fluid communication for the refrigerant to flow or reach out of each cavity 26. In this manner, the refrigerant flows into each stator 18, 22, 24 through the supply plenum 28 and exits each cavity 26 through the exhaust plenum 30. The refrigerant will maintain the surface temperature of the supply plenum 28 colder than the surface temperature of each cavity 26 at all times, allowing for radiation and convection exchange between the hotter cavity 26 to the colder plenum 28.

As shown in FIG. 1, the supply 28 and exhaust 30 plenums may be substantially concentric tubes, with either inside the other. For example, as shown in FIG. 1, the supply plenum 28 may surround the exhaust plenum 30. In alternate embodiments, however, the exhaust plenum 30 may surround the supply plenum 28. To ensure breadth of coverage of the claimed invention, the supply 28 and exhaust 30 plenums may be more generically referred to as first and second plenums, with the first plenum referring to either the supply 28 or the exhaust 30 plenum depending on the particular embodiment being defined in the claims, and the second plenum referring to the other plenum.

The tube-within-a-tube design provides many possible advantages over existing systems. For example, the supply 28 and exhaust 30 plenums provide an inexpensive structure for supplying refrigerant to and removing refrigerant from the stators 18, 22, 24, especially compared to intricate internal flow channels found in some stators in prior art systems. The supply 28 and exhaust 30 plenums may be manufactured and assembled independently from the stator manufacturing and assembly, providing additional flexibility and reduction in manufacturing costs.

In addition, the supply 28 and exhaust 30 plenums provide a reliable boundary to separate the refrigerant from the hot gas path. As a result, the pressure of the refrigerant may be substantially less than the combustion gas pressure without increasing the risk of combustion gases breaching through the stator wall. In addition, the refrigerant is not limited to air, which has a specific heat capacity of approximately 1,000 J/kgC. Instead, many other readily available fluids having superior specific heat capacity characteristics, such as specific heat capacities greater than 1500 J/kgC, may be used as refrigerant. For example, fuel (1670 J/kgC), water vapor (2,014 J/kgC), and water (4,186 J/kgC) are readily available fluids in a gas turbine combined cycle (GTCC) system that have superior specific heat capacities compared to air. Similarly, the refrigerant is not limited to air extracted from the compressor, which reaches temperatures in excess of 200 degrees Celsius. Instead, the many other readily available fluids at room temperatures (20 degrees Celsius) may be used as refrigerant. Inasmuch as the magnitude of heat transfer is directly proportional to the specific heat capacity of the refrigerant and the temperature difference, the tube-within-a-tube design provides the potential for greater heat transfer capability, given the same flow rate, than a system that relies exclusively on air as the refrigerant.

Although the cooling system shown in FIG. 1 is described and illustrated in the context of removing heat from a turbine stator, one of ordinary skill in the art would understand that the cooling system may be adapted to remove heat from virtually any gas turbine component. For example, the casing 16 may define a cavity, and the supply 28 and exhaust 30 plenums may be located in the cavity to provide cooling to the casing 16 surrounding the hot gas path. Similarly, each combustor may include a liner surrounding the combustion chamber. The supply 28 and exhaust 30 plenums may be located adjacent to the combustor liner to cool the combustion chamber.

Figure 2:
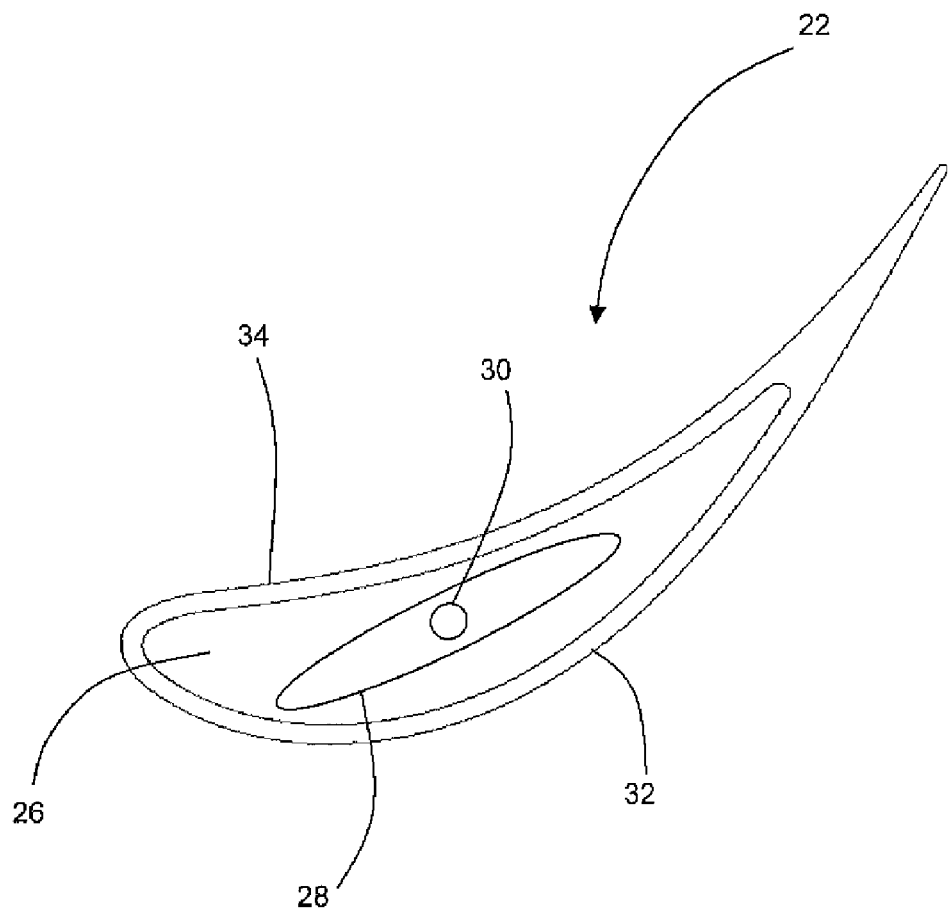
FIG. 2 provides a top plan view of a stator shown in FIG. 1 according to one embodiment of the present invention.

FIG. 2 provides a top plan view of a stator 18, 22, 24 shown in FIG. 1 according to one embodiment of the present invention. As shown, the stator 22 includes a pressure side 34 and a vacuum side 32 that combine to define the cavity 26 on the interior of the stator 22. The supply plenum 28 appears in FIG. 2 as a generally oval tube surrounding the exhaust plenum 30, which appears as a circular tube. However, as previously stated, in alternate embodiments the exhaust plenum 30 may surround the supply plenum 28. In addition, the supply 28 and exhaust 30 plenums may take any shape to facilitate fabrication and manufacturing or increase heat transfer.

Particular embodiments within the scope of the present invention may include additional features to facilitate or improve the heat transfer from the hot gas path to the refrigerant. For example, the surface area of the exterior of the supply plenum 28 shown in FIG. 2 may be enlarged to increase the surface area through which heat transfer may occur. In addition, the exterior surface of the supply plenum 28 may be as close as reasonably possible to the inside walls of the stator 22 to further facilitate the heat transfer to the refrigerant. Lastly, emissivity coatings may be applied to each surface of the stator 22, the supply plenum 28, and the exhaust plenum 30 to facilitate the passage of heat through the various surfaces to the refrigerant.

Figure 3:
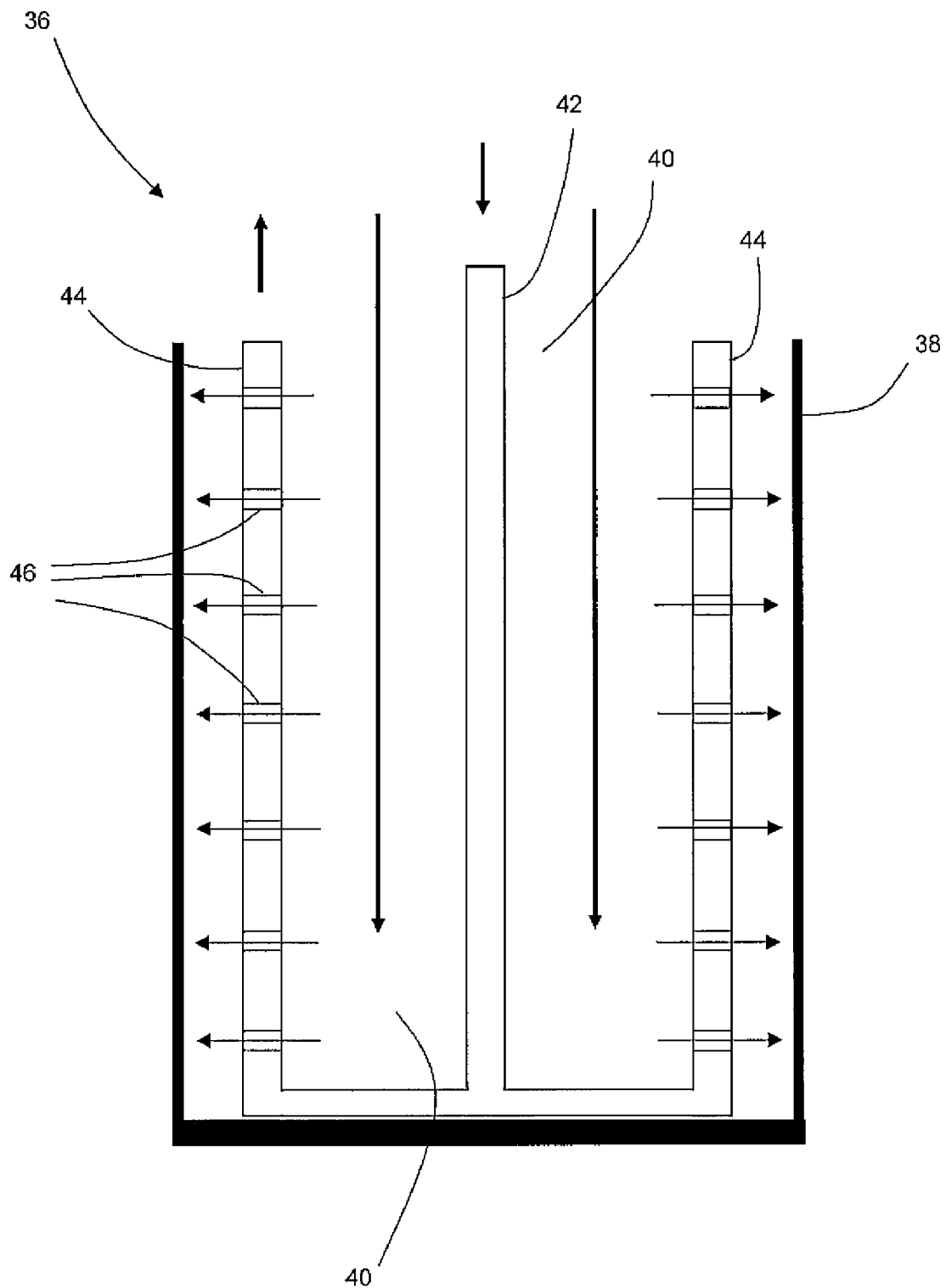
FIG. 3 shows a cross-section of an alternate embodiment of a cooling system within the scope of the present invention.

FIG. 3 shows a cross-section of an alternate embodiment of a cooling system 36 within the scope of the present invention. The component to be cooled again includes a surface 38 that defines a cavity 40 inside the component. The cooling system 36 again includes a supply plenum 42 that provides fluid communication for a refrigerant to flow or reach into the cavity 40. An exhaust plenum 44 that exits in the cavity 40 on either side of the supply plenum 42 may be a cylindrical shape surrounding the supply plenum 42, or it may be multiple tubes surrounding the supply plenum 42. The exhaust plenum 44 shown in FIG. 3 includes a plurality of apertures 46 that allow cooling air supplied to the cavity 40 to circulate through the exhaust plenum 44 to further improve the heat transfer to the component.

By virtue of the fact that the cooling system of the present invention contains the refrigerant in a closed loop separate from the cavity, combustion gases, or surrounding air, the cooling system of the present invention allows for many fluids, such as fuel, steam, air, and water, to be used as refrigerant that were not previously practical or possible. For example, a gas turbine combine cycle (GTCC) includes many fluid systems that are repeatedly heated and cooled or require preheating prior to use in the GTCC. The coolant system of the present invention may use any of these fluids as the refrigerant. As a result, the heat removal capability provided by the cooling system not only does not detract from the gas turbine thermodynamic efficiency, but it also may improve the thermodynamic efficiency of the GTCC by preheating various fluids used in the GTCC.

Figure 4:
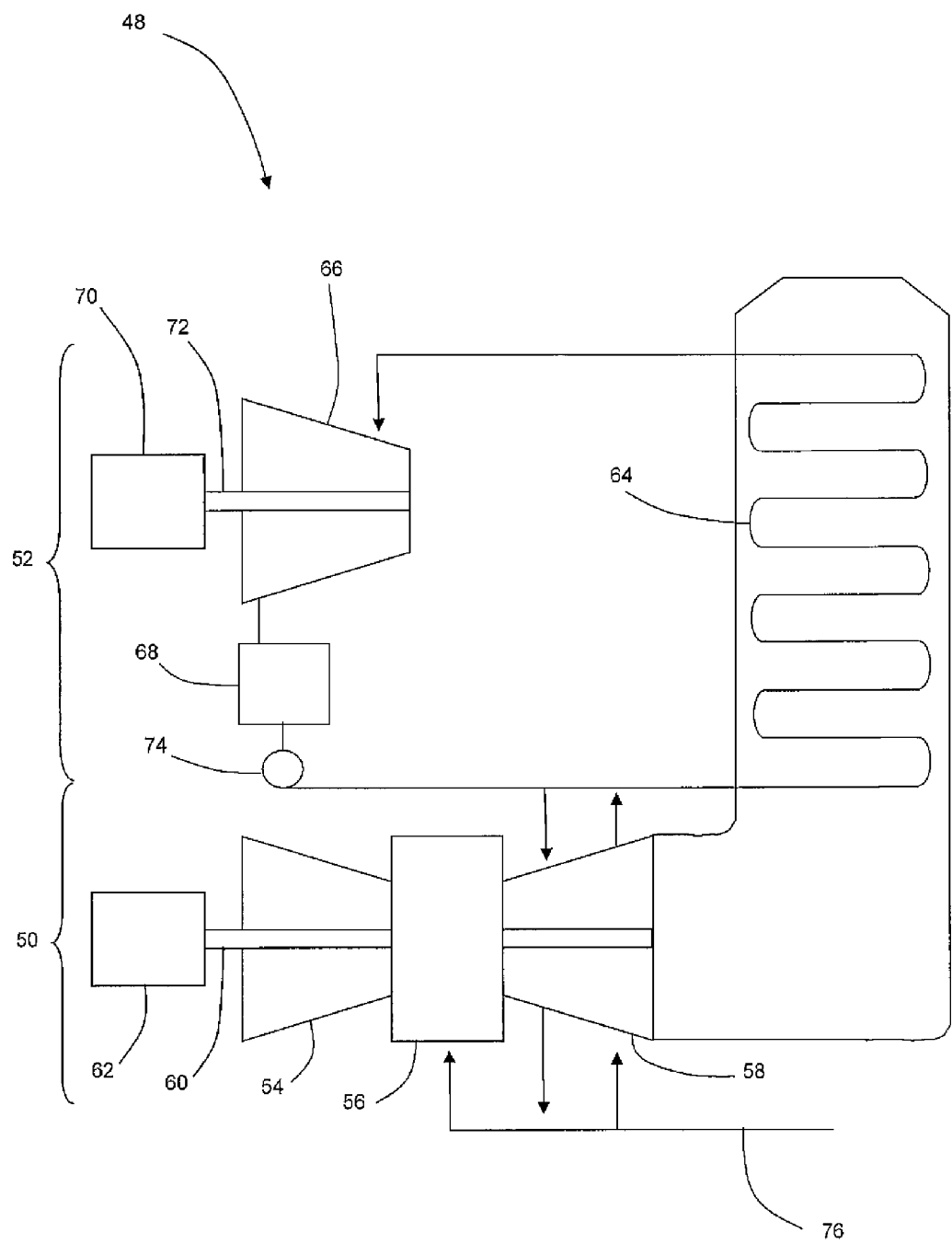
FIG. 4 shows an embodiment of the present invention in the context of a gas turbine combined cycle.

FIG. 4 shows an embodiment of the present invention in the context of a schematic representation of a GTCC 48. The GTCC 48 typically includes a gas turbine 50 combined with a heat recovery system 52. The gas turbine 50 includes a compressor 54 at one end, one or more combustors 56 around the middle, and a turbine 58 at the other end. The compressor 54 and turbine 58 connect to a common rotor 60, which drives a generator 62 to produce electricity. The heat recovery system 52 includes a closed loop system to recover heat from the gas turbine 50 to improve the overall thermodynamic efficiency of the gas turbine 50. The heat recovery system includes a heat exchanger 64, a steam turbine 66, a condenser 68, and an auxiliary generator 70. The heat exchanger 64 recovers heat from the combustion gases exiting the turbine 58 and generates steam from this recovered heat. The steam flows through the steam turbine 66 to turn a shaft 72 connected to the auxiliary generator 70 to produce power. The steam then flows to the condenser 68, and a pump 74 circulates the condensate back to the heat exchanger 64 where the cycle repeats.

As shown in FIG. 4, the present invention may utilize fluids from several points in the GTCC. For example, condensate between the condenser 68 and the heat exchanger 64 may be diverted from the heat recovery system 52 to the turbine 58 to cool the stators or casing, as previously described. In this manner, the condensate serves as a refrigerant to the turbine 58 to remove heat from the turbine 58, and the turbine 58 in turn serves as a preheater for the condensate before the condensate passes through the heat exchanger 64 to be converted into steam. This exchange of heat from the turbine 58 to the condensate reduces the temperature of the turbine components to allow higher combustion temperatures without sacrificing any thermodynamic efficiency in the gas turbine 50 as a whole.

The fuel consumed in the combustors 56 may also be used as a refrigerant to remove heat from the turbine components prior to combustion. For example, as shown in FIG. 4, a fuel line that provides fuel to the combustors 56 may first circulate a portion of that fuel to the turbine 58 prior to combustion to remove heat from the turbine components. Similarly, a portion of the air that goes through the compressor 54 of the gas turbine 50 can be redirected to turbine 58, used as a refrigerant to remove heat from the turbine components, and then later reintroduced back to the compressor 54. As with the condensate previously discussed, the exchange of heat from the turbine 58 to the fuel or to the air reduces the temperature of the turbine components and preheats the fuel or air to allow higher combustion temperatures without sacrificing any thermodynamic efficiency in the gas turbine 50 as a whole.

Preliminary calculations and estimates of embodiments of the present invention indicate a substantial increase in the radiation cooling provided to the gas turbine components. The improved radiation cooling may be used to supplement existing cooling systems to further reduce the temperature of gas turbine components or extend the time between maintenance cycles. Alternatively, the improved radiation cooling may be used to replace existing cooling systems entirely, depending on the operational considerations unique to each application.

It should be appreciated by those skilled in the art that modifications and variations can be made to the embodiments of the invention set forth herein without departing from the scope and spirit of the invention as set forth in the appended claims and their equivalents.

What is claimed is:

1. An apparatus for removing heat from a gas turbine having one or more combustors and a turbine, comprising:
   a. a component in the gas turbine, wherein the component includes a cavity therein;
   b. a first plenum inside the cavity;
   c. a second plenum inside the cavity and connected to the first plenum, wherein the second plenum surrounds the first plenum inside the cavity;
   d. a refrigerant flowing through the first plenum and the second plenum to remove heat from the component, wherein the first and second plenums define a closed loop for the refrigerant;
   e. a plurality of apertures through the closed loop that provide fluid communication for cooling air supplied to flow though the plurality of apertures and around the closed loop; and
   f. wherein one of the first or second plenums provides refrigerant flow out of the cavity.

2. The apparatus of claim 1, wherein the first plenum and the second plenum are substantially concentric tubes.

3. The apparatus of claim 1, wherein the second plenum defines the plurality of apertures therethrough.

4. The apparatus of claim 1, further including an emissivity coating on the second plenum.

5. The apparatus of claim 1, wherein the component in the gas turbine is a stator in the turbine.

6. The apparatus of claim 1, wherein the component in the gas turbine is a casing surrounding the turbine.

7. The apparatus of claim 1, wherein the refrigerant has a specific heat capacity greater than 1.5 kJ/kg C.

8. The apparatus of claim 1, wherein the refrigerant is fuel.

9. An apparatus for removing heat from a turbine, comprising:
   a. a stator;
   b. a cavity inside the stator;
   c. a first plenum inside the cavity;

d. a second plenum inside the cavity and connected to the first plenum, wherein the second plenum surrounds the first plenum inside the cavity;

e. a refrigerant flowing through the first plenum and the second plenum to remove heat from the stator wherein the first and second plenums define a closed loop for the refrigerant;

f. a plurality of apertures through the closed loop that provide fluid communication for cooling air supplied to the cavity to flow through the plurality of apertures and around the closed loop; and g. wherein one of the first or second plenums provides refrigerant flow out of the cavity.

10. The apparatus of claim 9, wherein the first plenum and the second plenum are substantially concentric tubes.

11. The apparatus of claim 9, wherein the second plenum defines the plurality of apertures therethrough.

12. The apparatus of claim 9, further including an emissivity coating on the second plenum.

13. The apparatus of claim 9, wherein the refrigerant has a specific heat capacity greater than 1.5 kJ/kg C.

14. The apparatus of claim 9, wherein the refrigerant is fuel.

15. An apparatus for removing heat from a gas turbine having one or more combustors and a turbine, comprising:

a. a component in the gas turbine, wherein the component includes a cavity therein;

b. a closed loop cooling system inside the cavity, wherein the closed loop cooling system includes a supply plenum connected to an exhaust plenum inside the cavity;

c. a refrigerant flowing through the supply and exhaust plenums;

d. a plurality of apertures through the closed loop cooling system, wherein the plurality of apertures provide fluid communication for cooling air supplied to the cavity to flow through the plurality of apertures and around the closed loop cooling system.

16. The apparatus of claim 15, wherein the supply plenum and the exhaust plenum are substantially concentric tubes.

17. The apparatus of claim 15, wherein the refrigerant has a specific heat capacity greater than 1.5 kJ/kg C.

18. The apparatus of claim 15, wherein the refrigerant is fuel.

* * * * *

UNITED STATES PATENT AND TRADEMARK OFFICE
CERTIFICATE OF CORRECTION

PATENT NO.         : 8,397,516 B2
APPLICATION NO.    : 12/571646
DATED              : March 19, 2013
INVENTOR(S)        : Jaime Javier Maldonado It is certified that error appears in the above-identified patent and that said Letters Patent is hereby corrected as shown below:

In the Claims

Column 6, line 46, "flow through the plurality of apertures and around the" should read
--the cavity to flow through the plurality of apertures and around the--

Signed and Sealed this
Twenty-seventh Day of May, 2014

Michelle K. Lee
*Deputy Director of the United States Patent and Trademark Office*